No. 764,234.

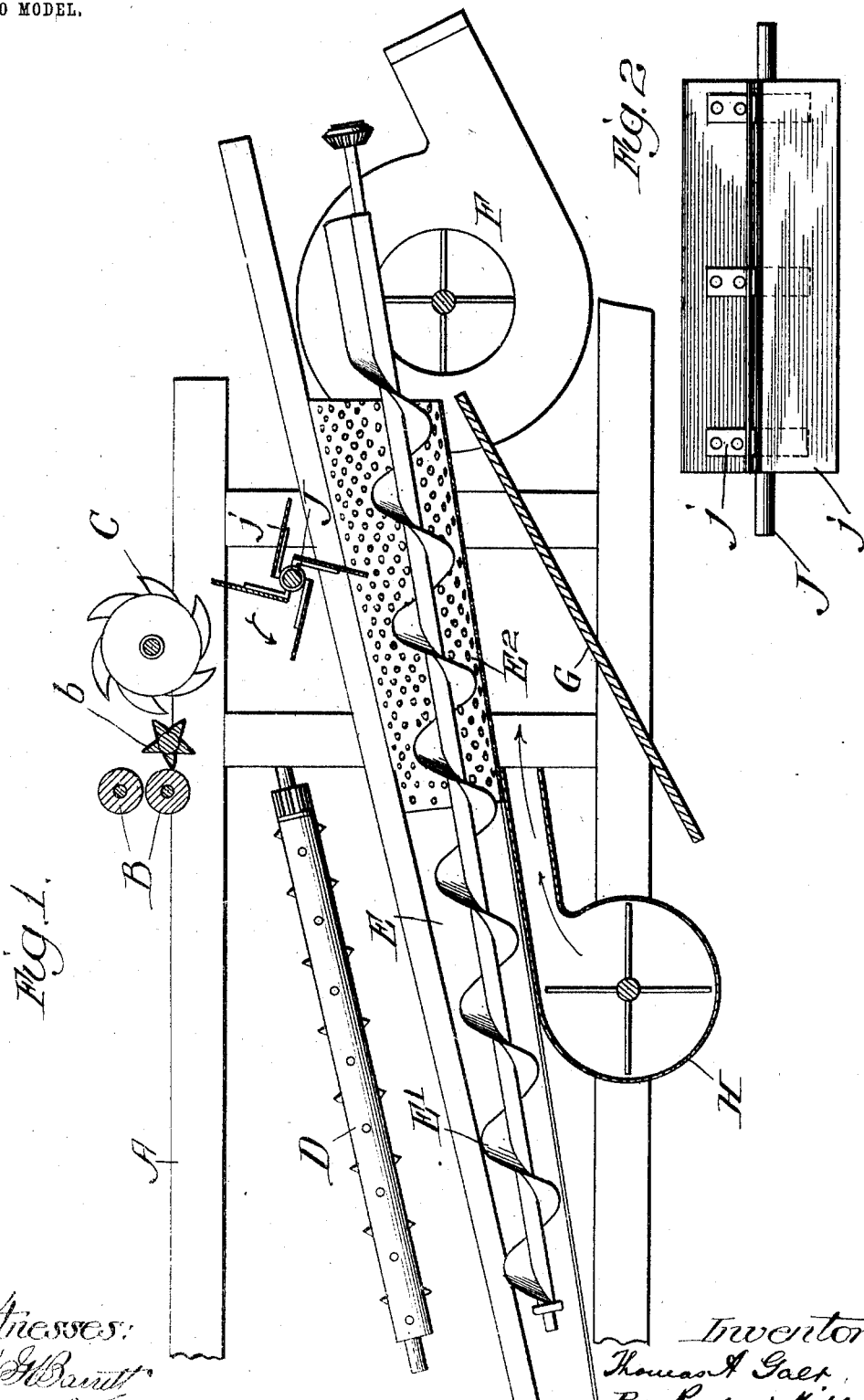

Patented July 5, 1904.

UNITED STATES PATENT OFFICE.

THOMAS A. GALT, OF STERLING, ILLINOIS.

CORN-HUSKER AND FODDER-SHREDDER.

SPECIFICATION forming part of Letters Patent No. 764,234, dated July 5, 1904.

Application filed January 29, 1903. Serial No. 140,985. (No model.)

*To all whom it may concern:*

Be it known that I, THOMAS A. GALT, a citizen of the United States, residing at Sterling, in the county of Whiteside, in the State of Illinois, have invented certain new and useful Improvements in Corn-Huskers and Fodder-Shredders, of which the following is a specification.

My invention relates to that class of machines known as "corn-huskers" and "fodder-shredders," and has for its principal object the provision of means for throwing the fodder backwardly away from the fan and upon the rear end of the conveying and discharging mechanism instead of being thrown directly into the fan, whereby the passage of the fodder through the machine is retarded and the clogging of the discharging mechanism and of the fan is prevented. At the same time the action of the said means or retarder serves to beat and thresh the fodder after being shredded, so as to permit of the separation and removal of all the grains of corn that may be mingled with such fodder, (after being accidentally shelled by the snapping-rolls,) because both of the beating action and the extended travel given to the fodder and any contained corn by being thrown backwardly toward the rear end of the conveying mechanism, as above explained.

In the accompanying drawings, Figure 1 is a vertical sectional elevation of a corn-husker and fodder-shredder embodying my invention; and Fig. 2, an elevation, on an enlarged scale as compared with Fig. 1, of the beater.

My machine has a suitable frame A, in which are mounted or arranged the mechanisms or operating parts common in such machines, such as the snapping-rolls B, cutter-bar $b$, shredder-head C, and husking-rolls D, all arranged and operating in the usual and well-known way, whereby the ears of corn are snapped from the stalks and permitted to drop upon the husking-rolls, by which they are husked and whereby the stalks are shredded and delivered to the discharging mechanism.

Suitable discharging mechanism may be employed, and in the present instance I have shown arranged below the husking-rolls and shredder-head a suitable trough E, in which rotates a spiral conveyer or screw E', driven in any desired manner and so arranged as to discharge the husks and fodder to suitable means for receiving and delivering the fodder, such as the blower-fan F, located at the front end of the machine, although other suitable and well-known means, such as an endless-belt conveyer or elevator, might be used for the purpose. This trough may be made of sheet metal and is shown provided in its rear portion with perforations to form a separator $E^2$ to permit passage of loose grains of corn shelled at the snapping-rolls and mingled with the fodder. This shelled corn passes through such separator and drops upon an inclined corn-board G, arranged below the trough and adapted to deliver the corn to any suitable point or receptacle, as usual in such machines. To clean the shelled corn as it drops upon the board and is being delivered thereby, I provide a cleaning-fan H, arranged below the imperforate part of the trough and delivering the air in the space between the perforate part of such trough and the corn-board, whereby any dust or other foreign matter may be expelled or separated from the corn and blown into the blower-fan or a fodder-elevator and be thereby discharged from the machine.

The machine thus far described is similar in general construction and operation to that illustrated in Patent No. 718,902, granted to me as assignee on January 20, 1903, on the invention of Ira G. Berry; but in such Berry machine the discharging mechanism was liable to become clogged, and the grains of corn mingled with the fodder were not all removed or separated by the trough, but some grains were carried out by the conveyer and discharged with the fodder. To overcome these objections and cause a retarding of the fodder through the machine and also cause a separation of all the corn from the fodder, I have devised novel and efficient mechanism arranged below the shredder-head and called by me a "retarder," because of its function of retarding or beating backwardly and threshing the shredded fodder as it drops from the shredder-head. In the present instance this retarder comprises a rotatable shaft J, driven in an anticlockwise direction, Fig. 1, by any ordinary means, such as gearing or belt and pulley, and having a series of flat blades $j$, secured to the shaft by radial arms $j'$ or otherwise, which arms are by preference arranged in planes parallel to tangents on the shaft, whereby the blades will strike the fodder falling between the snapping-rolls and shredder-head, so as to throw it backward and downward upon the front end of the spiral conveyer and at the same time sufficiently thresh it to separate the grains of corn in such manner as that their separation by the conveyer and trough will be assured. However, the retarder might be constructed otherwise than as herein illustrated, so long as its proper and intended functions are accomplished.

The retarder is arranged intermediate the shredder-head and the spiral conveyer and at a point above the separator portion of the trough to the end that the corn when dislodged from the fodder will tend to drop downwardly upon the separator portion of the trough, while the fodder, being lighter, will be thrown to the rearward part of the conveyer instead of being permitted to go direct to the fan and clog the same, and any corn not separated or dislodged by the immediate action of the beater will be sure to be separated by the action of the conveyer during its extended travel through the trough.

By the means described clogging of the conveyer and the fan is effectually prevented and the shelled corn which has heretofore been discharged with the fodder will be saved and all of such corn will be separated and be delivered in clean condition.

I claim—

1. In a corn-husker and fodder-shredder, the combination of snapping-rolls, a cutter-bar, a shredder-head, a trough arranged beneath the shredder-head and provided with a conveyer, a retarder arranged above said trough toward its front end and having beater-blades, and means for rotating said retarder so as to throw the material coming from between the said snapping-rolls and shredder-head backward and downward on the conveyer; substantially as described.

2. In a corn-husker and fodder-shredder, the combination of snapping-rolls, a cutter-bar, a shredder-head, a trough arranged beneath the shredder-head and provided with a rotating screw or conveyer, a blower, a retarder having beater-blades and arranged above said trough and near said fan, and means for rotating said retarder so as to throw the material coming from between the said snapping-rolls and shredder-head backward and downward on the screw; substantially as described.

THOMAS A. GALT.

Witnesses:
  W. E. LONG,
  CHAS. HOSTETTER.